United States Patent
Matsuura et al.

(10) Patent No.: US 7,434,739 B2
(45) Date of Patent: Oct. 14, 2008

(54) ANTENNA CIRCUIT, IC INLET, IC TAG, AND IC CARD, AS WELL AS MANUFACTURING METHOD OF IC TAG AND MANUFACTURING METHOD OF IC CARD

(75) Inventors: Katsuyoshi Matsuura, HigashiMatsuyama (JP); Taiga Matsushita, Tokyo (JP)

(73) Assignee: Lintec Corporation (JP)

( * ) Notice: Subject to any disclaimer, the term of this patent is extended or adjusted under 35 U.S.C. 154(b) by 0 days.

(21) Appl. No.: 11/406,432

(22) Filed: Apr. 19, 2006

(65) Prior Publication Data
US 2006/0237544 A1    Oct. 26, 2006

(30) Foreign Application Priority Data
Apr. 25, 2005    (JP) .............................. 2005-126571

(51) Int. Cl.
*G06K 19/06* (2006.01)
(52) U.S. Cl. ................... 235/492; 340/572.7; 340/572.1
(58) Field of Classification Search .......... 343/700 MS, 343/895, 873, 700 R, 742, 767; 235/492, 235/451; 340/572.7, 572.4, 572.9, 572.1
See application file for complete search history.

(56) References Cited

U.S. PATENT DOCUMENTS

| | | | | |
|---|---|---|---|---|
| 3,017,633 | A * | 1/1962 | Marston et al. | 343/853 |
| 4,369,557 | A * | 1/1983 | Vandebult | 29/25.42 |
| 4,583,099 | A * | 4/1986 | Reilly et al. | 343/895 |
| 4,658,264 | A * | 4/1987 | Baker | 343/895 |
| 4,800,369 | A * | 1/1989 | Gomi et al. | 340/568.2 |
| 4,935,093 | A * | 6/1990 | Reeb | 216/6 |
| 5,751,256 | A * | 5/1998 | McDonough et al. | 343/873 |
| 6,278,413 | B1 * | 8/2001 | Hugh et al. | 343/818 |
| 2002/0183743 | A1 * | 12/2002 | Held | 606/46 |
| 2003/0135998 | A1 | 7/2003 | Walz et al. | 29/854 |

(Continued)

FOREIGN PATENT DOCUMENTS

DE    4428732    1/1996

(Continued)

OTHER PUBLICATIONS

JP 2003-173426, Lintec Corp., ID Tag and ID Tag Characteristic Adjusting Method, published: Jun. 20, 2003, English translation.*

*Primary Examiner*—Daniel A Hess
(74) *Attorney, Agent, or Firm*—Bacon & Thomas, PLLC (57) ABSTRACT

An IC tag and an IC card are provided to achieve reduction in size, improvement on workability and the yield rate when manufacturing, reduction of manufacturing cost, etc., The IC tag of this invention is formed for transmitting information in non-contact manner, and two pieces of antenna circuits 2 are folded and superposed on each other therebetween. One of the two pieces of antenna circuits 2 is a mounted circuit 2A on which an IC chip 6 is not mounted, and the other is an opened circuit 2B on which on IC chip 6 is mounted. On one surface of the antenna circuit 2 is provided a surface printing material 10 on which visible information is printed. On the other surface of the antenna circuit 2 is provided an adhesive member, so that the antenna circuit 2 can be stuck with each other by folding a circuit support portion 4.

9 Claims, 9 Drawing Sheets

U.S. PATENT DOCUMENTS

2004/0077388 A1* 4/2004 Crum ................. 455/575.3
2004/0130500 A1* 7/2004 Takei ................. 343/895

FOREIGN PATENT DOCUMENTS

| | | |
|---|---|---|
| EP | 1291818 | 3/2003 |
| JP | 2001-010264 | 1/2001 |
| JP | 2001-251115 | 9/2001 |
| JP | 2003-173426 | 6/2003 |
| WO | 2004/012138 | 2/2004 |

* cited by examiner

ANTENNA CIRCUIT, IC INLET, IC TAG, AND IC CARD, AS WELL AS MANUFACTURING METHOD OF IC TAG AND MANUFACTURING METHOD OF IC CARD

CROSS-REFERENCE TO RELATED APPLICATION

This application claims, under 35 USC 119, priority of Japanese Application No. 2005-126571 filed Apr. 25, 2005.

BACKGROUND OF THE INVENTION

The present invention relates to an IC tag of non-contact type for use in a personal identification, in commodity control, in physical distribution, etc.

The non-contact type IC tag mainly includes an IC chip and an antenna circuit, in the structures thereof. In manufacturing of such the IC tag, the resonance frequency between the IC chip and the antenna circuit is determined, by means of capacitance and inductance thereof. For adjusting the resonance frequency, adjustment must be made on the capacitance and the inductance, respectively. Ordinarily, the capacitance is a value, which is inherent or unique to the IC chip, and for the purpose of changing the value thereof, it is necessary to add a capacitance in the antenna circuit. Also, for the purpose of changing the inductance, it is necessary to increase and decrease the number of turns and/or change a circuit length of the antenna circuit.

Conventionally, the following measures are proposed for dealing with the problems mentioned above.

For example, Japanese Patent Laid-Open No. 2001-010264 proposes a measure of adding a capacitance in the antenna circuit. Also, Japanese Patent Laid-Open No. 2001-251115 proposes a method of making an adjustment by changing the length of the antenna circuit. Herein, the antenna circuit is so designed that the antenna circuit has the resonance frequency lower than a desired one, in advance, for the purpose of making an adjustment on the inductance thereof. And then, the adjustment is made upon the inductance through decreasing the number of turns and/or shortening the circuit length thereof.

Also, other means is proposed in Japanese Patent Laid-Open No. 2003-173426, for the purpose of obtaining a desired resonant frequency. Thus, in this patent document, there is proposed a method for adjusting characteristics; i.e., suppressing dispersion between the products on the desired characteristic due to a mutual inductance function by fitting two surfaces of antenna circuits upon the surfaces thereof, or enlarging a communication distance with an interrogator much more than that of the conventional one.

By the way, such the IC tag as mentioned above has the following drawbacks:

Thus, in the Japanese Patent Laid-Open No. 2001-010264, the capacitor and the resistor for use of adjustment are provided within the antenna circuit. Therefore, there are problems of increasing the number of parts and the manufacturing cost thereof, and obstructing reduction in size of the device.

The method shown in the Japanese Patent Laid-Open No. 2001-251115 has a problem that a yield rate is lowered, resulting in disturbing reduction in size of the device.

The resonance frequency (f) between the IC chip and the antenna circuit is determined by the capacitance (C) of the IC chip and the inductance (L) of the antenna circuit. Thus, the relationship between them can be expressed by the following equation (1):

$$f = 2\pi \times 1/(LC)^{1/2} \quad (1)$$

As is apparent from this equation, making the inductance (L) large enables the resonance frequency to be lower. In adjustment of the inductance mentioned above, the inductance (L) must be large in advance, for the purpose of designing the antenna circuit to have a resonance frequency lower than the resonance frequency desired. For this purpose, the number of turns must be large. However, if the number of turns is increased, a yield rate of the circuit is lowered, resulting in disturbing reduction in size of the IC tag in a final form of the products.

In the Japanese Patent Laid-Open No. 2003-173426, the two surfaces of the antenna circuits are fitted onto each other, causing difficulties in the operations. Thus, such the structure of fitting the two surfaces of the antenna circuits requires the operations of forming circuit by a double-sided printing, and also attaching a single body of the antenna circuit, which is formed by a one-sided printing, onto each other. Therefore, this causes difficulties in the operations.

SUMMARY OF THE INVENTION

According to the present invention, there are provided the followings:

(1) An antenna circuit including a plurality of antenna circuits constructed so that each antenna circuit is superposed thereon, by folding between the antenna circuits.

(2) An IC inlet mounts an IC chip on one or the plurality of the antenna circuits mentioned in the above (1).

(3) An IC tag has one set of the IC inlets mentioned in the above (2) provided on a substrate portion.

(4) The IC tag has two substrate portions for supporting said antenna circuit and displaying visible information thereon; a circuit supporting portion for connecting said two substrate portions and superposing two antenna circuits supported on each substrate portion on each other, while fitting the positions thereof mentioned in the above (3).

(5) An IC card has one set of the IC inlets mentioned in the above (2) provided on a substrate portion.

(6) A method for manufacturing an IC tag, including the steps of:

forming antenna circuits on a belt-like substrate portion;

punching out the substrate portion, on which the antenna circuits are formed, into a tag-like shape; and folding a portion between the plurality of antenna circuits formed on the tag-like substrate portion.

(7) A method for manufacturing an IC card, including the steps of:

forming antenna circuits on a belt-like substrate portion;

punching out the substrate portion, on which the antenna circuits are formed, into a card-like shape; and folding a portion between the plurality of antenna circuits formed on the card-like substrate portion.

With those, it is possible to superpose each of the antenna circuits easily and correctly, thereby to increase workability when manufacturing the IC tag or the IC card, and further obtaining a reduction in the manufacturing cost, an improvement on the yield rate, as well as reduction in size.

Those and other objects, features and advantages of the present invention will become more readily apparent from the following detailed description when taken in conjunction with the accompanying drawings wherein:

PREFERRED EMBODIMENT OF THE INVENTION

Hereinafter, various embodiments according to the present invention will be explained by referring to the drawings attached therewith. However, explanation herein will be made about the structures of providing two antenna circuits on an IC tag, as an example thereof.

The IC tag according to the present embodiment includes two antenna circuits, which are formed on the same plane of a substrate, one antenna circuit being in a form of a mounted circuit mounting an IC chip thereon, while the other antenna circuit being in the form of an opened circuit mounting no IC chip thereon. And, after superposing an adhesive material and sticking a substance for use of a surface printing thereon, the substrate is punched out into a desired tag-like shape through a tag processing, and then the substrate is folded at the central portion to be stuck on each other when used as a tag, thereby obtaining a desired resonance frequency. More details of the structures of this IC tag will be explained by referring to FIGS. 1 to 7.

An IC tag 1 mainly includes antenna circuits 2, substrate portions 3, and a circuit support portion 4, as shown in FIGS. 1 to 4.

The antenna circuits 2 are provided by two pieces, one of the antenna circuits 2 is a mounted circuit 2A which is to mount an IC chip 6 thereon. The other antenna circuit 2 is an opened circuit 2B which does not mount the IC chip 6 thereon, provided as a circuit for adjusting the resonance frequency.

The mounted circuit 2A includes a connector terminal 5 for use of mounting the IC chip, the IC chip 6 to be mounted on the IC chip mounting terminal 5, and a jumper 7 for connecting both ends of a circuit under the condition of being insulated by an insulating film 7A. The number of turns of the mounted circuit 2A is predetermined so that the resonance frequency comes to be higher than a desired resonance frequency. The number of turns is arbitrary, but if reduction in size of the IC tag 1 is taken into the consideration, it is preferably determined to be the same as or less than the number of turns of the opened circuit. The opened circuit 2B is constructed with only a coil-like wiring, both ends thereof being opened without mounting the IC chip thereon.

The antenna circuits 2 are provided at least one of the surfaces of a circuit substrate 8.

The antenna circuits 2 can be built up, through a method of winding a covered wire into a coil-like shape, printing conductive paste into a coil-like shape, or alternatively, a method of forming a conductive metal layer of copper or the like, which is laminated on the circuit substrate, into a coil-like shape through etching, etc., for example.

Examples of the conductive paste include a substance which can be obtained by dispersing a metal powder of gold, silver, nickel, etc., into a binder. Examples of the binder include polyester resin, polyurethane resin, or epoxy resin, etc.

Figure 7:
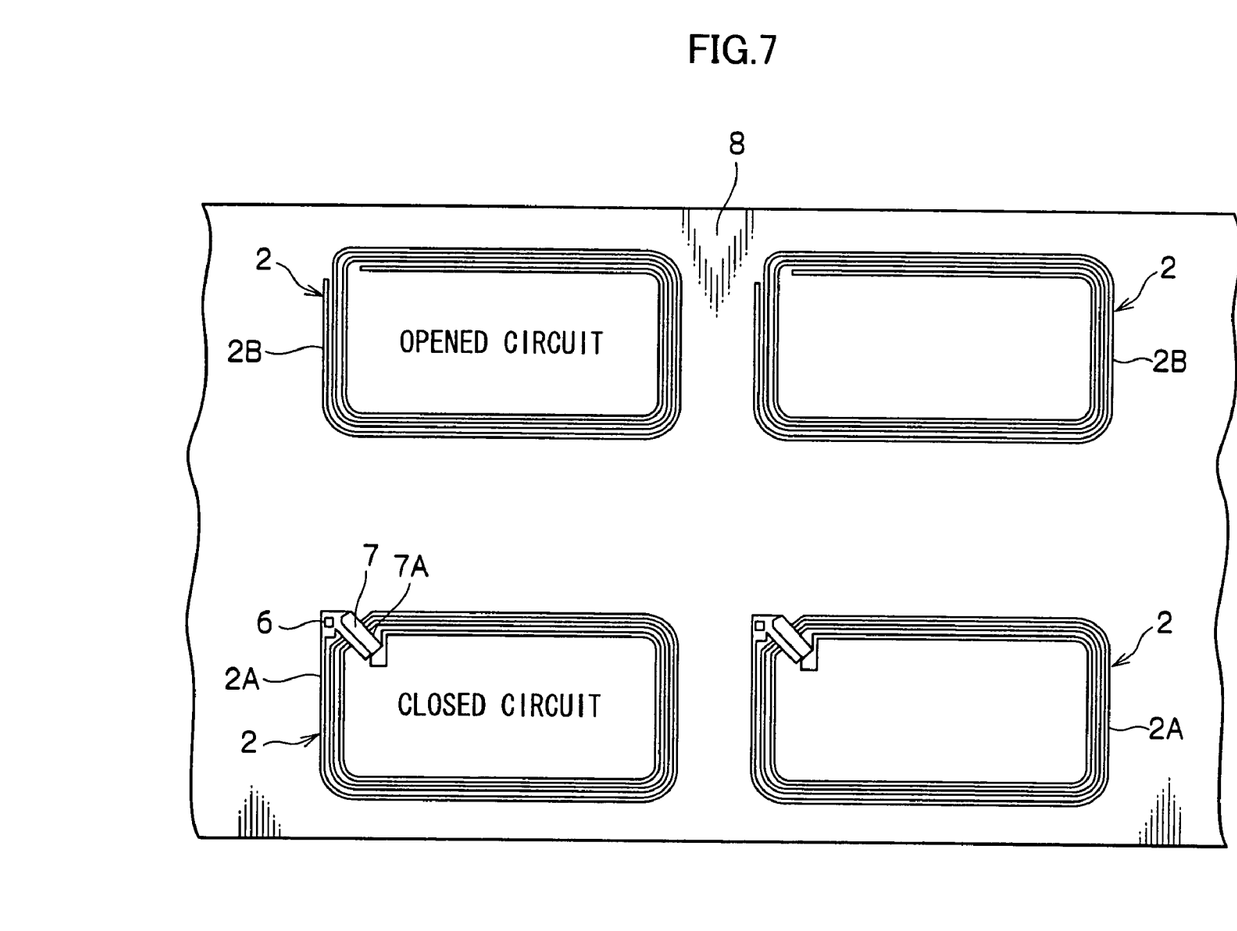
FIG. 7 is a plane view showing the condition of mounting the IC chip through forming the antenna circuits on the circuit substrate.

An "IC inlet" means a component that can be obtained by mounting the IC chip 6 on the mounted circuit 2A as shown in FIG. 7, among the antennal circuits 2. According to the present invention, it is sufficient that the IC chip is mounted on at least one or the plurality of antenna circuits as a single constituent element thereof. The IC chip may be electrically connected to the antenna circuit, but a method for mounting thereof should not be restricted to, in particular. From a viewpoint of thinning the thickness thereof, it is preferable to adopt a flip-chip mounting, with which a circuit surface of the IC chip is laminated on a side of the antenna circuit surface. When the IC chip is connected, a bonding material may be used. For example, this bonding material includes an anisotropic conductive paste (hereinafter, referred to as "ACP"), etc.

Figure 5:
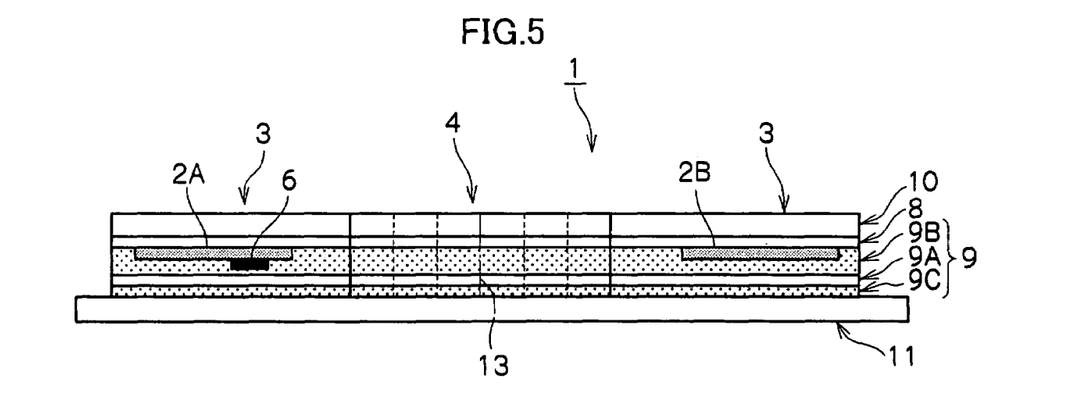
FIG. 5 is a side cross-section view showing the IC tag according to the embodiment of the present invention.

The substrate portion 3 is a portion for supporting the antenna circuits 2, and for displaying a visible information 3C. This substrate portion 3, as shown in FIG. 5, mainly includes the circuit substrate 8, a double-sided adhesive material 9, a surface printing material 10, and a release liner 11. Each of the layers is presented to be thick in FIG. 5, so as to be easily understood. However, actually, the thickness of the entire is less than 1 mm, approximately, from the surface printing material 10 up to the release liner 11.

The circuit substrate 8 is a substrate for supporting each of the antenna circuits 2, respectively. On the surface of the circuit substrate 8 is provided the antenna circuits 2. Specifically, the circuit substrate 8 on which the mounted circuit 2A is provided and the circuit substrate 8 on which the opened circuit 2B is provided are supported, as a pair, on the circuit-supporting portion 4. The two pieces of antenna circuits 2 are aligned on the surfaces (i.e., the same surface) of the circuit substrates 8, respectively.

Examples of circuit substrate 8 include a paper, such as woodfree paper, a coated paper or the like, and a film of synthetic resin, etc. Examples of synthetic resin film can include polyethylene, polypropylene, polyethylene terephthalate, polyurethane, polyimide, etc. There is no restriction on the thickness of the circuit substrate 8, in particular; however, preferably, it may be 5 to 200 μm, more preferably 15 to 125 μm, in particular.

The double-sided adhesive material 9 is an adhesive material for sticking the two circuit substrates 8 on which each of the antenna circuits 2 is provided. The double-sided adhesive material 9 is attached upon each of the circuit substrates 8 under the condition of covering the antenna circuits 2, respectively. The double-sided adhesive material 9 and the circuit substrates 8 are attached by superposing the respective circuit substrates 8, which are supported on the circuit support portion 4, and thereby forming a tag. Alternatively, the double-sided adhesive material 9 may be superposed only upon the antenna circuit 2A or 2B.

The double-sided adhesive material 9 includes a support 9A, an adhesive layer 9B, and adhesive layer 9C. Examples of the support 9A include a synthetic resin film, a paper, a non-woven fabric, etc. Examples of the synthetic resin film can include various kinds of materials such as polyethylene terephthalate, polypropylene, polyvinyl chloride, polyurethane, polyimide, etc. The materials are determined in the thickness thereof, to be 10 to 100 μm, more preferably 12 to 80 μm, to be applied. This is the thickness determined by taking the strength and the flexibility into the consideration, both of which are required for the double-sided adhesive material 9. Alternatively, in the place of the double-sided adhesive material 9 of the three layers, the only adhesive layer 9B having a single layer can be used.

The adhesive layer 9B is a layer provided on one side of the surfaces of the support 9A for sticking the circuit substrates 8 covering over the IC chip 6 and the antenna circuits 2. The adhesive layer 9B can follow and hermetically seal the concaves and convexes on the surfaces of the IC chip 6 and the antenna circuits 2. It is necessary to use the adhesive layer 9B having a sufficient adhesive strength. For example, there may be applied an adhesive of a rubber base, an acryl base, a silicone base, or a polyurethane base, etc. Among of the adhesives, the adhesive of the acryl base is superior from a viewpoint of the adhesive strength. The thickness of the adhesive layer 9B may be determined to be 10 to 100 μm, and more preferably 20 to 60 μm. This thickness may be determined to have such a thickness that the layer can follow the concaves and convexes on the surfaces of the IC chip 6 and the antenna circuits 2.

The adhesive layer 9C is a layer, which is provided on the other surface of the support 9A, for sticking onto each other when the IC tag 1 is folded up. Any material may be employed as long as the adhesive layer 9C can keep the condition of sticking together without separate when the tag is folded up. For example, there can be applied an adhesive such as a rubber base, an acryl base, a silicone base, a polyurethane base, etc. On the surface of this adhesive layer 9C is provided the release liner 11. The release liner 11 can protect the adhesive layer 9C when printing is made on the surface before folding.

As the release liner 11, it is preferable to provide a layer of a release agent, at least on one surface of the liner. Example of the liner can include a paper such as a polyethylene laminated paper, a coated paper, or a glassine paper, etc., or a synthetic resin film of polyethylene, polypropylene, polyethylene terephthalate, etc. Example of the release agent can include a silicone resin, a fluoro resin, a long-chain alkyl resin, etc.

The surface printing material 10 is a member on which the visible information 3C such as a commodity information is printed. On this surface printing material 10 is printed the visible information 3C such as a commodity information, a price, a barcode, etc. (see FIG. 2). This visible information 3C is displayed on both surfaces of the IC tag 1 under the condition where the IC tag 1 is folded up (See FIGS. 3 and 4). When the visible information 3C is printed only on one side of the surface printing material 10, the visible information 3C can be displayed only on one surface of the IC tag 1 under the condition where the IC tag 1 is folded up. The surface printing material 10 includes a material suitable for printing on the surface thereof. For example, a synthetic resin film, a synthetic paper, a non-woven fabric, or a paper, etc. is used. Also, depending upon the necessity thereof, there may be used the materials on which a recording layer can be formed, applicable with various kinds of recordings such as a thermal recording, a pressure-sensitive recording, a laser-beam recording, and an inkjet recording, etc.

The circuit support portion 4 is a part for superposing the two pieces of antenna circuits 2 on each other, while supporting and positioning the antenna circuits 2, respectively. Herein, the circuit support portion 4 is shaped to be a connected plate-like, so as to connect the two pieces of substrate portions 3 with each other. At a central portion of the circuit support portion 4 is formed a crease 13. The crease 13 is a portion for superposing the two pieces of the substrate portions 3 on each other, while supporting and folding the two pieces of the substrate portions 3 and correctly keeping the positions. On the crease 13 is provided a means for guiding the folding, such as a break, a perforation, a groove, etc., so that the circuit support portion 4 can be correctly folded along the portion of the crease 13. With this, the two pieces of substrate portions 3 can be superposed on each other, while correctly keeping the positions, and thereby superposing the two pieces of antenna circuits 2 on each other, so that two pieces of antenna circuits 2 are correctly positioned at the setting positions. Further, the circuit support portion 4 includes two pieces of through-holes 14 symmetrical with the crease 13. The two pieces of through-holes 14 are holes for passing a string or the like, or a wire, etc. The two pieces of through-holes 14 come to be one piece of a hole under the condition where the circuit support portion 4 is folded along the crease 13, and the string, the wire, etc., are passed through the hole to be tied up with the commodity. The through-holes 14 are formed on the circuit support portion 4, by two pieces, during the punching process of the IC tag 1. The through-holes 14 are determined appropriately about the sizes, the setup positions, etc., of the holes, depending on a use mode of the IC tag 1, for example, a way of tying thereof, etc. The shape of the holes should not be limited to a round, but may be determined in an arbitrary shape such as a polygon (a triangle, a quadrangle, a hexagon, etc.).

In the embodiment mentioned above, the IC chip 6 is mounted only on the mounted circuit 2A, and no IC chip 6 is mounted on the opened circuit 2B; however, the IC chip 6 may be also mounted on the opened circuit 2B. In this case, information is written into the only one of the IC chips 6 without using the other IC chip 6, and the other IC chip 6 is used as a resonance frequency adjusting circuit. And in this case, depending on the kind of the information to be written, the one IC chip 6 may be used while using the other as the resonance frequency adjusting circuit, or the other IC chip 6 may be used while using the one as the resonance frequency adjusting circuit.

Also, the winding direction of the opened circuit 2B may be reversed to that of the mounted circuit 2A, or may be forward in the direction thereof. The winding directions may be determined appropriately depending upon the setup when manufacturing thereof or the characteristics required, etc.

In case where three or more antenna circuits 2 are provided, two or more mounted circuits 2A may be provided. In this case, the antenna circuits 2 and the mounted circuits 2A may be used separately in different manners, depending upon the kind of the information to be written therein, or may be used as a spare part for shortage of the capacity or failure of the operation thereof.

The IC tag 1 thus constructed will be formed in the following manner.

Figure 6:
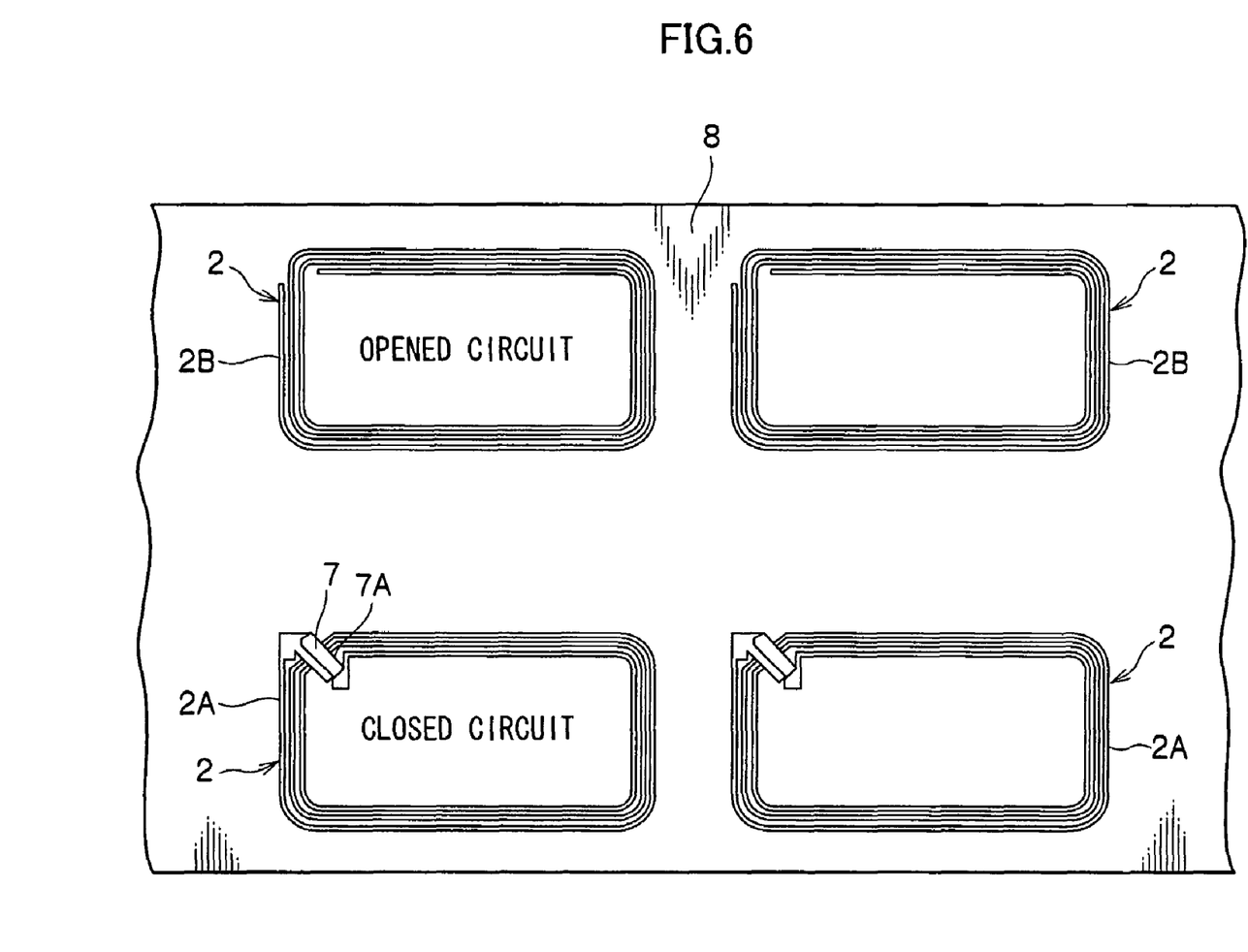
FIG. 6 is a plane view showing the condition where the antenna circuits are formed on a circuit substrate.

First, the antenna circuits 2 are formed on the circuit substrate 8. The above-mentioned etching method is used to form the antenna circuits 2 on the circuit substrate 8. In this case, as shown in FIG. 6, two pieces of the antenna circuits 2 (i.e., the mounted circuit 2A and the opened circuit 2B) are formed on the long circuit substrate 8, as a pair thereof, continuously aligning the pair of the antenna circuits 2 on the same plane surface. There are various patterns for aligning the antenna circuits 2 on the circuit substrate 8. Herein, the pair of antenna circuits 2 is aligned single line in the longitudinal direction of the circuit substrate; however, the pair of antenna circuits 2 may be aligned in a plurality of lines. The alignment may be appropriately determined, depending on the number of pieces of the circuits to be formed.

After forming the antenna circuits 2, while forming the insulation film 7A and the jumper 7 thereon, the IC chip 6 is mounted, as shown in FIG. 7, and thereby forming an IC inlet. Thus, while providing the double-sided adhesive material 9 so as to cover the IC chip 6, etc., the surface printing material 10 and the release liner 11 are formed on the surfaces on both sides thereof, and thereby forming a long belt-like formation.

Also, depending on the necessity thereof, upon the surface of the surface printing material 10 is printed the visible information 3C such as the commodity information, the price, the barcode, etc.

When conducting the punching process thereon, the tag-like shape is punched out from the long belt-like formation. With this, the IC tag 1 is made up, having the two pieces of substrate portions 3 and the circuit support portion 4 for connecting the substrate portions 3 under the extended condition.

Next, the release liner 11 is peeled off, and the two pieces of substrate portions 3 are folded up along the portion of the crease 13 on the circuit support portion 4, and two pieces of substrate portions 3 are fitted in the positions and superposed under the condition of adjusting the respective antenna circuits 2 to each other. Next, depending upon the necessity thereof, the string or the like is passed through the through-holes 14 to be tied up with the product.

First Variation

Figure 8:
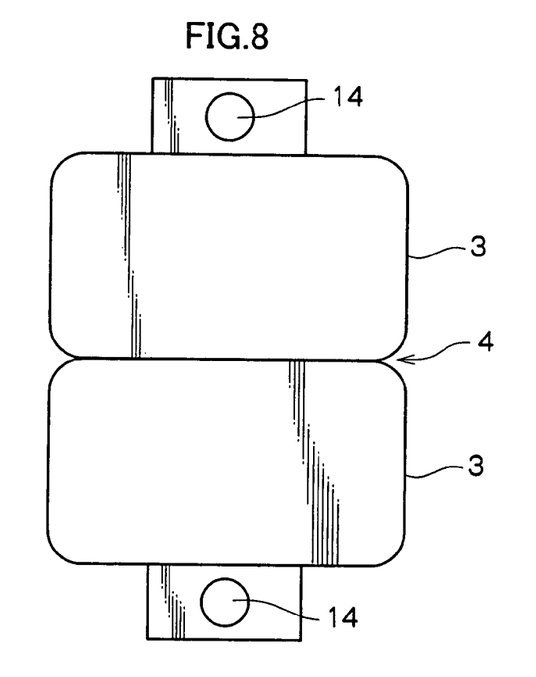
FIG. 8 is a plane view showing a first variation according to the present invention.

A first variation will be shown in FIG. 8. FIG. 8 shows the structures, so that the circuit support portion 4 has the width nearly equal to that of the substrate portion 3, so that the two pieces of substrate portions 3 are supported thereon. The through-holes 14 are provided on those two pieces of substrate portions 3, respectively in the outer side thereof. In this case, since the width of the circuit support portion 4 is wide, it is possible to support the substrate portions 3, more stably.

Second Variation

Figure 9:
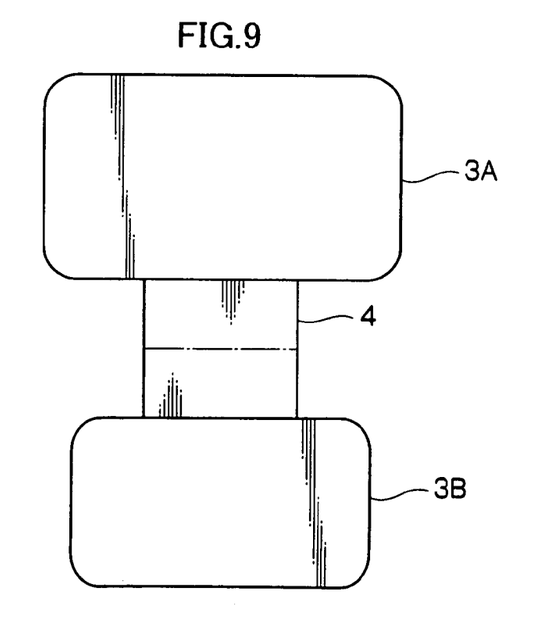
FIG. 9 is a plane view showing a second variation according to the present invention.

A second variation will be shown in FIG. 9. In the embodiment mentioned above, although the sizes and the number of turns of the antenna are determined to be nearly equal to each other, between the mounted circuit 2A and the opened circuit 2B; however, the sizes and the number of turns of the antenna may be changed depending on the characteristics required for the IC tag 1. For example, as shown in FIG. 9, the substrate portion 3B on which the opened circuit is mounted may be smaller than the substrate portion 3A on which the mounted circuit is mounted, so as to make the size and the number of turns of the antenna on the opened circuit small. On the contrary, the sizes and the number of turns of the antenna on the opened circuit may be made larger than those on the mounted circuit. Thus, the sizes and the number of turns of the antenna may be determined appropriately, depending on the characteristics required.

Third Variation

Figure 10:
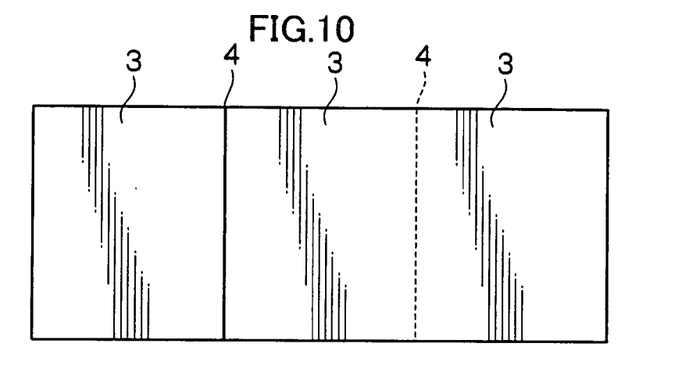
FIG. 10 is a plane view showing a third variation according to the present invention.
Figure 11:
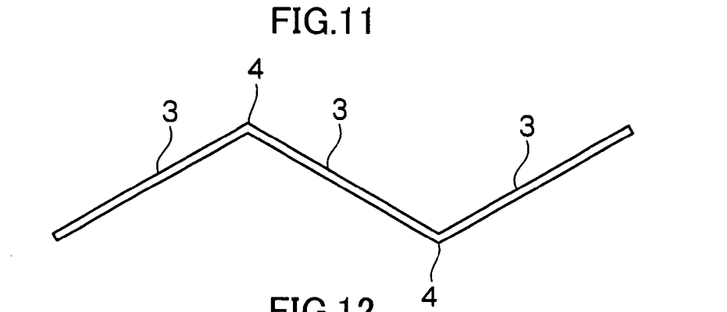
FIG. 11 is a side view showing the third variation according to the present invention.

A third variation will be shown in FIGS. 10 and 11. In the embodiment mentioned above, the antenna circuits 2 are formed by two pieces of circuits, i.e., the mounted circuit 2A and the opened circuit 2B. However, the antenna circuits 2 may be formed by three pieces of the circuits. For example, when forming the antenna circuit 2 with three pieces of circuits, as shown in FIGS. 10 and 11, three substrate portions 3 are alighted, and the circuit support portions 4 are provided among the substrate portions 3. With this, it is possible to superposing the three pieces of circuits on one another, while fitting the positions, easily and correctly.

Fourth Variation

Figure 12:
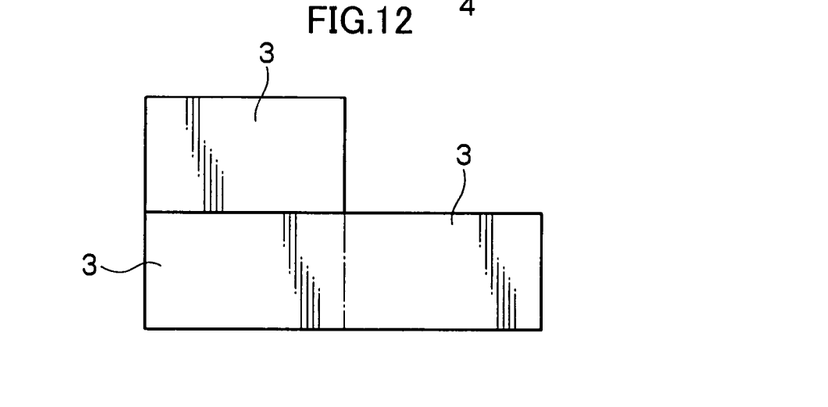
FIG. 12 is a plane view showing a fourth variation according to the present invention.

A fourth variation will be shown in FIG. 12. In the embodiment mentioned above, the antenna circuits 2 are formed with the two pieces of circuits, i.e., the mounted circuit 2A and the opened circuit 2B. However, as shown in FIG. 12, the antenna circuits 2 may be formed by aligning three pieces of substrate portions 3 in a manner of "L"-shape. Similarly, when aligning four or more antenna circuits 2, the antenna circuits 2 may be lined or aligned in a zigzag manner, so as to superpose the substrate portions 3, respectively.

Fifth Variation

Figure 13:
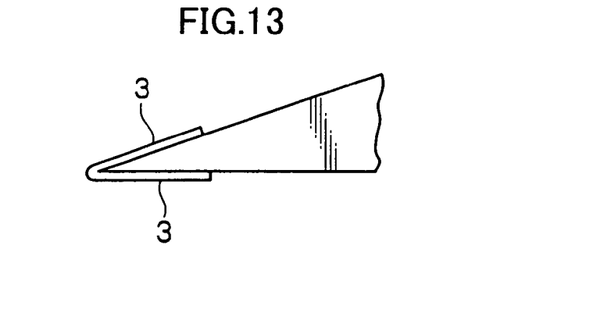
FIG. 13 is a side view showing a fifth variation according to the present invention.

A fifth variation will be shown in FIG. 13. In the embodiment mentioned above, the substrate portions 3 are stuck on each other without a gap. However, the substrate portions 3 may be provided with a gap, depending on use mode of the tag. For example, as shown in FIG. 13, the substrate portions 3 may be attached on a wedge-like member. Also, within a range causing no problem in the characteristics required for the IC tag 1, each of the substrate portions 3 can be inclined to each other or keeping a certain degree of gap.

Sixth Variation

Figure 17:
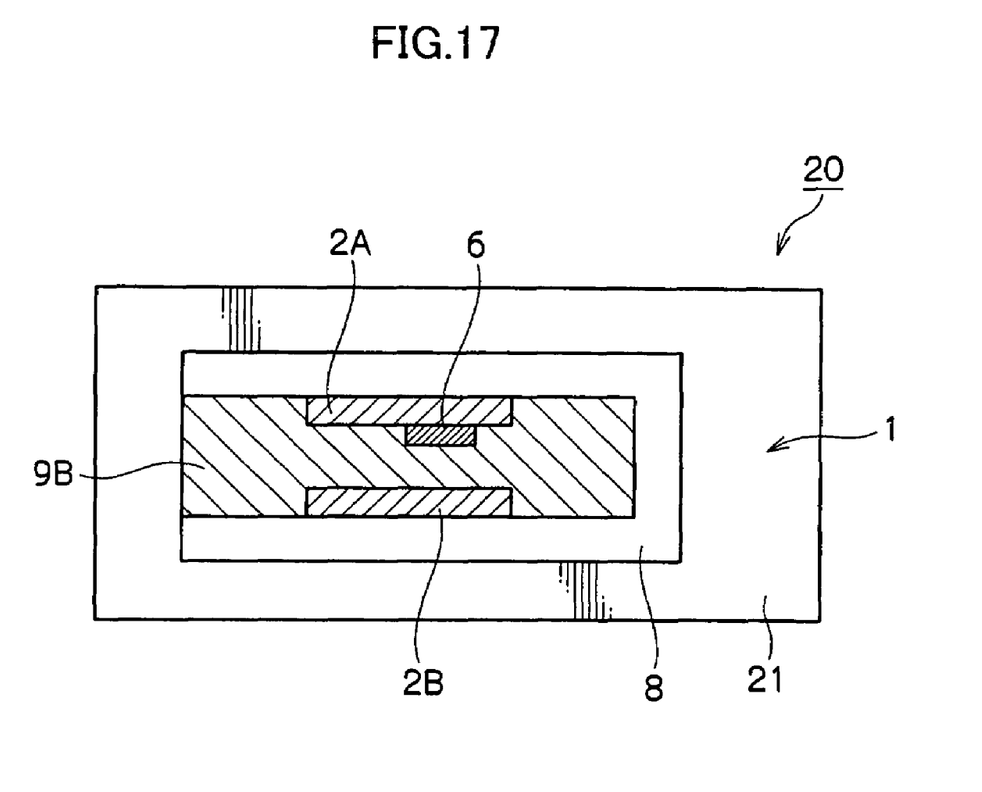
FIG. 17 is a side view showing a sixth variation according to the present invention.

A sixth variation will be shown in FIG. 17. As shown in FIG. 17, the antenna circuits 2A and 2B are formed on the circuit substrate 8, and then the IC chip 6 is mounted thereon, and thereby forming the IC inlet. The IC inlet is folded and stuck onto each other by the adhesive 9B, thereby making up the IC tag 1. The IC tag 1 is sealed up by using a synthetic resin 21, thereby building up an IC card 20. Examples of the synthetic resin to be applied herein include polyethylene terephthalate, polycarbonate, acryl-nitril butadiene styrene resin, etc. The thickness of the IC card may be determined to cover the IC card sufficiently, but not restricted thereto, in particular.

Seventh Variation

Both of the two pieces of the antenna circuits 2 (i.e., the mounted circuit 2A and the opened circuit 2B) are provided on a surface (i.e., only on one surface) of the circuit substrate 8 in the embodiment mentioned above. However, one of the antenna circuits 2 may be provided on the one surface of the circuit substrate 8 while the other may be provided on a reverse surface of the circuit substrate 8. Also in this case, functions and effects similar to those of the embodiment mentioned above can be obtained.

Eighth Variation

Also, in case of the commodity contained in a bag, the IC tag 1 may be put into the bag together with the commodity. In this case, the through-holes 14 are not necessary.

Ninth Variation

The antenna circuits 2 are formed into quadrilateral shapes in the embodiment mentioned above. However, it is needless to say that the antenna circuits 2 may be formed into other shapes such as a round shape, etc., depending on the shape of the IC tag 1. Also, the present invention may be applied into others than the IC tag 1 such as the IC card into which the antenna circuit 2 can be installed, for example.

FIRST USE EXAMPLE

Figure 14:
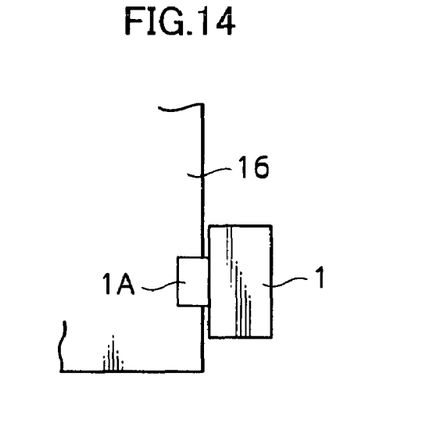
FIG. 14 is a plane view showing a first example of application, according to the present invention.

A first use example of the IC tag will be shown in FIG. 14. In the embodiment mentioned above, the string or the like or the wire is passed through the through-holes 14, so as to tie up the IC tag 1 on the commodity. However, various kinds of methods can be applied for attaching the IC tag 1, depending on the shapes and so on, of the commodity. When the IC tag 1 is used as an index of a book, for example, as shown in FIG. 14, a portion for sticking 1A may be provided to stick the IC tag on an end of a page 16 of the book. In this case, the IC tag 1 has the structures as shown in FIG. 8. However, no through-hole 14 is provided in the portion for sticking 1A.

SECOND USE EXAMPLE

Figure 15:
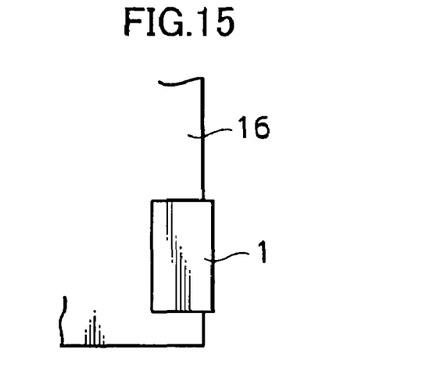
FIG. 15 is a plane view showing a second example of application according to the present invention.

A second use example of the IC tag will be shown in FIG. 15. As shown in FIG. 15, the IC tag may be stuck by sandwiching the page 16 of the book. In this case, no portion for sticking 1A is provided as shown in FIG. 14.

THIRD USE EXAMPLE

Figure 16:
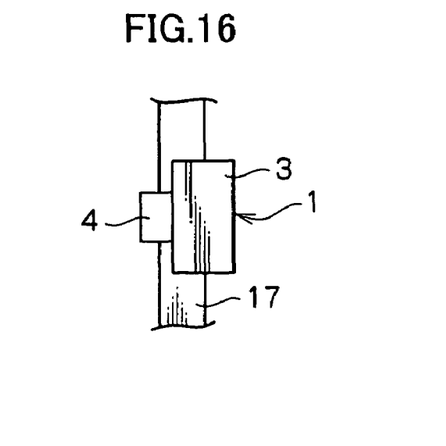
FIG. 16 is a plane view showing a third example of application according to the present invention.

A third use example of the IC tag will be shown in FIG. 16. In the case of an elongate attaching object 17, as shown in FIG. 16, the IC tag 1 (i.e., the IC tag having the same structures to the IC tag 1 shown in FIG. 1) may be attached by sandwiching the attaching object 17 between the substrate portion 3 and the circuit support portion 4 with the substrate portion 3 and the circuit support portion 4 stuck by the adhesive.

Embodiment

The circuit substrate 8 uses a film of polyethylene terephthalate (hereinafter, referred to as "PET") having thickness of 50 μm. A base material for forming the antenna circuit 2 uses a long belt-like member, having width of 50 mm and length of 10 m, of a product of sticking a copper foil/PET, a NIKAF-LEX (a product of NIKKAN INDUSTRIES, Co. Ltd.) on which a copper foil having thickness of 35 μm is stuck. On this basic material is printed an etching resist pattern through the screen printing method, and thereafter, unnecessary copper foils are removed through an etching. Further, the jumper 7 is formed for building up a connection between the innermost portion and the outermost portion of the circuit, on which the IC chip 6 will be mounted thereafter (i.e., the mounted circuit 2A), with using an insulating resist ink (for example, ML25089 made by Acheson (Japan) Limited.) and an Ag paste agent (for example, DW250L-1 made by TOYOBO LTD.) through the screen printing method. The antenna circuit 2 has line width of 0.12 mm, line pitch of 0.13 mm, 15 turns of the mounted circuit, 14 turns of the opened circuit, and outer sizes of the antenna circuit 15×15 mm, respectively. As shown in FIG. 6, thirty pieces of a set of antenna circuits 2 are formed on the long belt-like circuit substrate 8 having width 50 mm and length 750 mm, with the mounted circuit 2A and the opened circuit 2B aligning in parallel.

A RFID-IC chip 6 (I-Code, made by Royal Philips Electronics Co.) is mounted on the antenna circuit 2 through thermo-compression bonding, under the condition 200° C.-300 gf-10 sec, by using a flip chip mounting machine (for example, FB30T-M made by Kyushu Matsushita Electric Co., Ltd.) and anisotropic conductive paste (for example, TAP0402E made by KYOCERA Chemical Corporation.) as a bonding material, for producing thirty pieces of a set of IC inlets.

Next, as shown in FIG. 5, the double-sided adhesive material 9 (for example, PET25W PAT1 8KX 8EC made by LINTEC Corporation) is stuck on a surface of the IC inlet having the IC chip thereon, while peeling out a one-side release liner 8EC (a side of the adhesive layer 9B). Next, the surface printing material 10 (for example, FR3412-50 made by LINTEC Corporation) obtained by applying an adhesive applying on a PET is stuck on a surface opposite to the surface mounting the IC chip on the circuit substrate 8 having the IC inlet.

Figure 1:
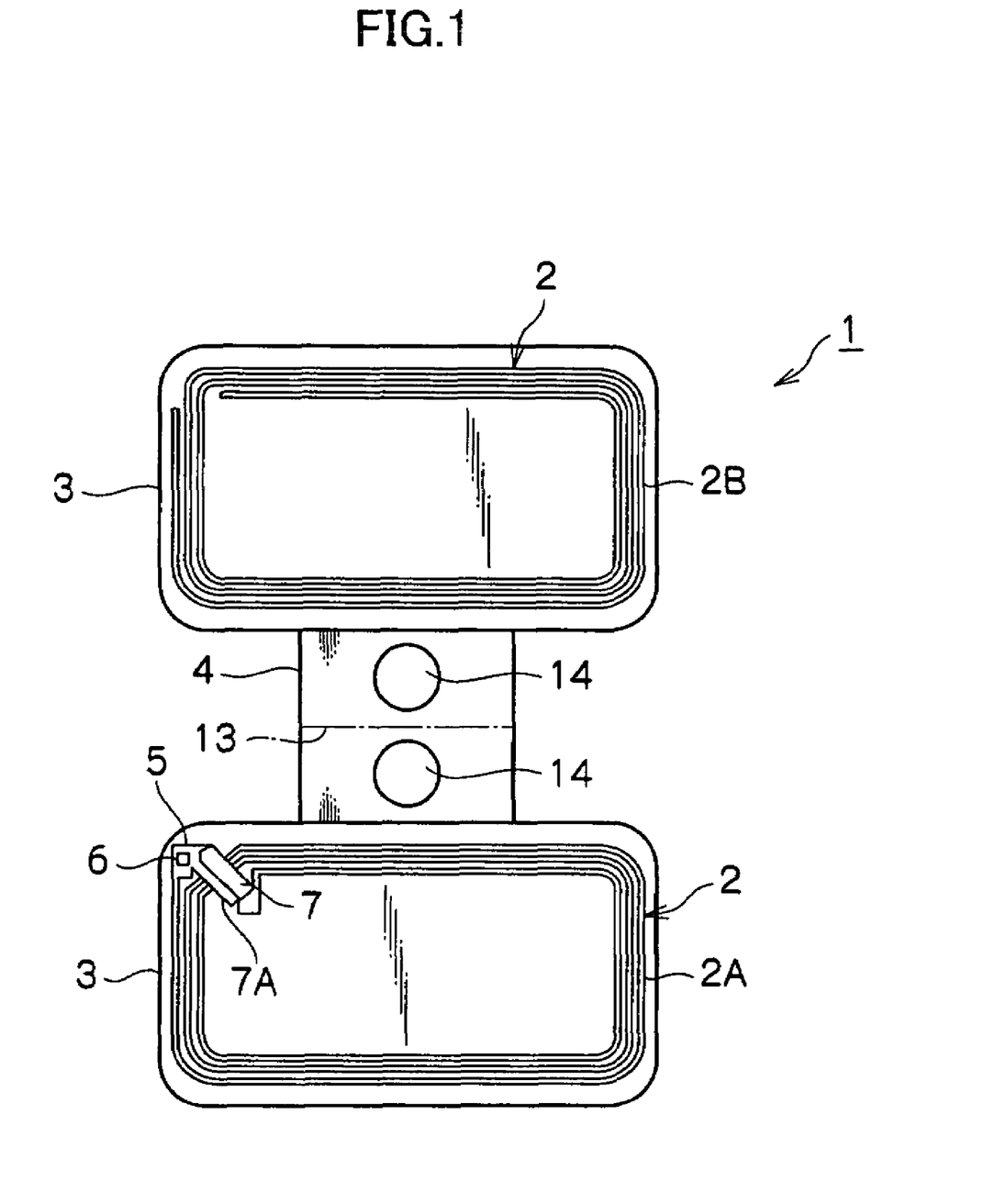
FIG. 1 is a plane view showing, from a reverse side, the extended condition of an IC tag according to an embodiment of the present invention.
Figure 2:
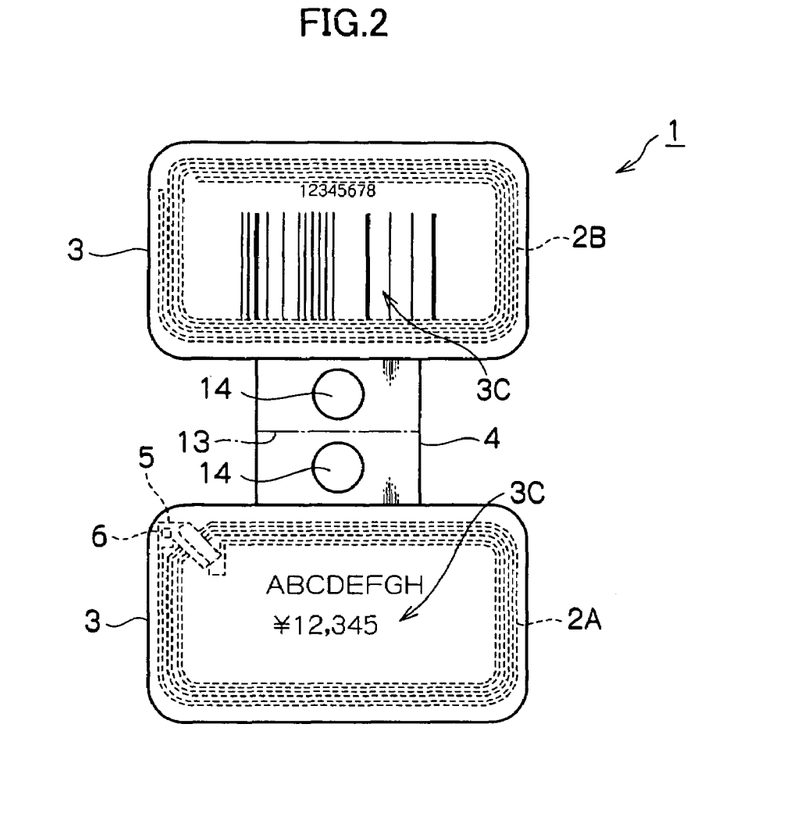
FIG. 2 is also a plane view showing, from a front side, the extended condition of an IC tag according to the embodiment of the present invention.
Figure 3:
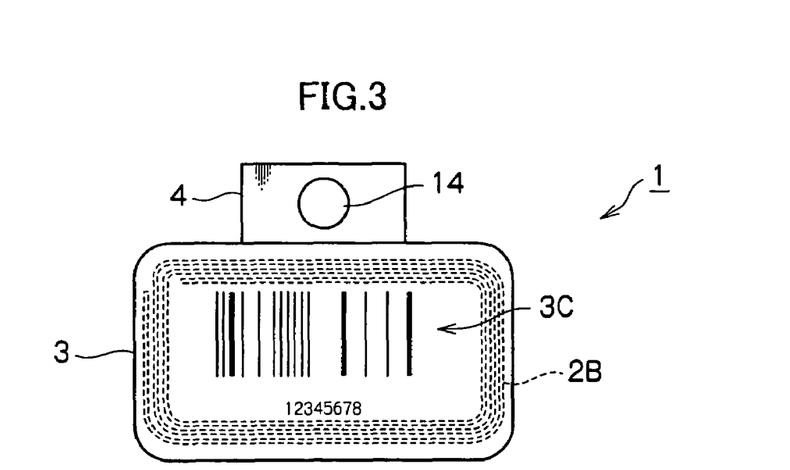
FIG. 3 is a plane view showing, from one side, the condition of sticking the IC tag according to the embodiment of the present invention.
Figure 4:
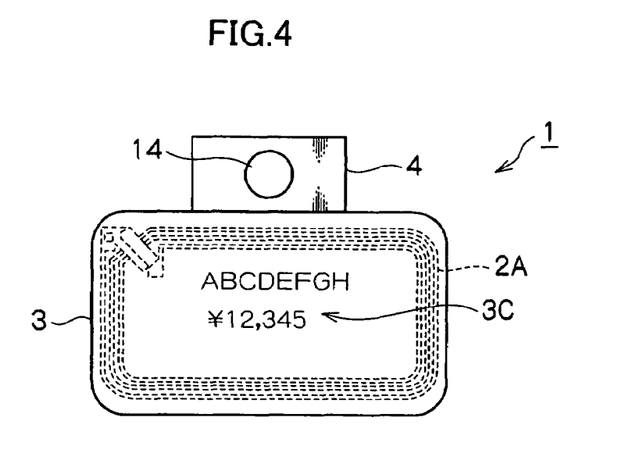
FIG. 4 is also a plane view showing, from the other side, the condition of sticking the IC tag according to the embodiment of the present invention.

Further, the punching process is conducted, so as to obtain the shape of the tag having outer diameter 19×19 mm, as shown in FIG. 1. Next, while peeling out the release liner 8KX and folding the IC inlet along the crease 13 on the circuit support portion 4, the mounted circuit 2A and the opened circuit 2B are stuck together, piling up on each other; thereby making up thirty pieces of the IC tags, as shown in FIG. 3.

The operation of the IC tags 1 made up in the manner mentioned above is checked through a testing method as follows.

Herein, the testing method makes a Read/Write test in relation to RFID by using an I Code evaluation kit, SLEV 400 made by Royal Philips Electronics Co., and a resonance waveform/resonance frequency test by using a network analyzer 8712ET made by Agilent Technologies Inc.

The result is shown in Table 1.

TABLE 1

| | Tag Sizes | Yield Rate (Non-defective/n-Number) | Resonance Frequency |
|---|---|---|---|
| Embodiment | 19 × 19 mm | 100% (30/30) | 13.6 MHz |
| Comparison 1 | 26 × 20 mm | 100% (30/30) | 13.7 MHz |
| Comparison 2 | 19 × 19 mm | 87% (26/30) | 13.7 MHz |
| Comparison 3 | 19 × 19 mm | 100% (30/30) | 16.1 MHz |

In the comparison 1, the IC tags of 26×20 mm in an outer diameter of tag are made up by thirty pieces; e.g., each tag having only one piece of the antenna circuit of 22×16 mm in an outer diameter thereof, having only the mounted circuit without the opened circuit thereon and 15 turns in the number of turn of the circuit, in a similar manner to the embodiment, except that the antenna circuit is not folded to be superposed.

In the comparison 2, the IC tags of 19×19 mm in an outer diameter are made up by thirty pieces, in a similar manner to the comparison 1, except that the antenna circuit, having 23 turns in the number of turn of the circuit and 15×15 mm in an outer diameter, is used as the mounted circuit.

In the comparison 3, the IC tags of 19×19 mm in an outer diameter are made up by thirty pieces, in the similar manner to the comparison 1, except that the antenna circuit, having 15 turns in the number of turn of the circuit and 15×15 mm in an outer diameter, is used as the mounted circuit.

As shown in the Table 1, it is possible to obtain the desired resonance frequency 13.6 MHz in the embodiment and 13.7 MHz in the comparisons 1 and 2. On the contrary, the desired resonance frequency cannot be obtained in the comparison 3, e.g., 16.1 MHz. In the comparison 1, the tag comes to be large in the sizes thereof, and in the comparison 2, the antenna circuit has a poor yield rate due to a short-circuit or disconnection of the circuit.

Effects of the Embodiment

As mentioned above, superposing the opened circuit 2B of optimal number of turns onto the mounted circuit 2A of the antenna circuit 2 correctly can achieve the IC tag 1 having the desired resonance frequency (or, required characteristics) by the antenna circuit 2 of a small size. As a result, it is possible to make the IC tag 1 small in size.

It is also possible to reduce the numbers of turns of the antennas of the mounted circuit 2A and the opened circuit 2B. Therefore, it is possible to improve the yield rate when forming the antenna circuit.

Further, with an aid of the crease 13 on the circuit support portion 4, it is possible to superposing the mounted circuit 2A and the opened circuit 2B, easily and correctly, and thereby obtain an increase on workability when manufacturing the IC tag 1.

Accordingly, it is possible to reduce the manufacturing cost of the IC tag 1.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An antenna circuit, comprising:
   a plurality of independent and non-electrically connected, coiled antenna circuits;
   a circuit supporting portion for supporting each antenna circuit and positioning the antenna circuits so that they are superposed; and
   a crease for guiding the circuit supporting portion so that the circuit supporting portion can be folded to superpose said antenna circuits, the crease including a break, a perforation, or a groove for guiding a folding of the circuit supporting portion,
   wherein the coiled antenna circuits are constructed so that each antenna circuit is superposed thereon by folding between the antenna circuits.

2. The antenna circuit according to claim 1, wherein three antenna circuits are aligned in a single line, two said circuit supporting portions are respectively provided between the three antenna circuits, each said circuit supporting portion is creased, and the three antenna circuits are constructed so that each antenna circuit is positioned to be superposed on each other upon folding of creases in each of the circuit supporting portions.

3. The antenna circuit according to claim 1, wherein three said antenna circuits are aligned in an L-shape, two said circuit supporting portions being respectively provided between said antenna circuits, the three antenna circuits being constructed so that each antenna circuit is positioned to be superposed on each other upon folding of creases in each of the circuit supporting portions.

4. An IC inlet, comprising:
   at least one or a plurality of independent and non-electrically connected, coiled antenna circuits on which an IC chip is mounted, wherein each independent and non-electrically connected, coiled antenna circuit comprises:
   a plurality of antenna circuits;
      a circuit supporting portion for supporting each antenna circuit and positioning the antenna circuits so that they are superposed; and
   a crease for guiding the circuit supporting portion so that the circuit supporting portion can be folded to superpose said antenna circuits, the crease including a break, a perforation, or a groove for guiding a folding of the circuit supporting portion,
   wherein the coiled antenna circuits are constructed so that each antenna circuit is superposed thereon, by folding between the independent and non-electrically connected, coiled antenna circuits.

5. An IC tag, comprising: a set of IC inlets provided on a substrate portion, wherein each of said IC inlets comprises:
   at least one or a plurality of independent and non-electrically connected, coiled antenna circuits on which an IC chip is mounted, wherein each independent and non-electrically connected, coiled antenna circuit comprises:
   a plurality of antenna circuits;
   a circuit supporting portion for supporting each antenna circuit and positioning the antenna circuits so that they are superposed; and
   a crease for guiding the circuit supporting portion so that the circuit supporting portion can be folded to superpose said antenna circuits, the crease including a break, a perforation, or a groove for guiding a folding of the circuit supporting portion,
   wherein the coiled antenna circuits are constructed so that each antenna circuit is superposed thereon, by folding between the independent and non-electrically connected, coiled antenna circuits.

6. The IC tag according to claim 5, further comprising:
   two substrate portions for supporting said independent and non-electrically connected, coiled antenna circuit and displaying visible information therein; and
   a circuit supporting portion for connecting said two substrate portions and superposing two antenna circuits supported on each substrate portion on each other, while fitting the positions thereof.

7. An IC card, comprising:
   a set of IC inlets provided on a substrate portion, wherein each of said IC inlets comprises:
   at least one or a plurality of independent and non-electrically connected, coiled antenna circuits on which an IC chip is mounted; and
   a crease for guiding the circuit supporting portion so that the circuit supporting portion can be correctly folded, the crease including a break, a perforation, or a groove for guiding a folding of the circuit supporting portion, wherein each independent and non-electrically connected, coiled antenna circuit comprises a plurality of antenna circuits, and is constructed so that each antenna circuit is superposed thereon, by folding between the independent and non-electrically connected, coiled antenna circuits.

8. A method for manufacturing an IC tag, comprising the steps of:

forming a plurality of independent and non-electrically connected, coiled antenna circuits on a belt substrate portion;

punching out the substrate portion, on which the independent and non-electrically connected, coiled antenna circuits are formed, into a tag shape; and folding, along a crease, the tag substrate portion between the plurality of independent and non-electrically connected, coiled antenna circuits formed thereon, the crease including a break, a perforation, or a groove for guiding a folding of the circuit supporting portion.

9. A method for manufacturing an IC card, comprising the steps of:

forming a plurality of independent and non-electrically connected, coiled antenna circuits on a belt substrate portion;

punching out the substrate portion, on which the independent and non-electrically connected, coiled antenna circuits are formed, into a card shape; and folding, along a crease, the card substrate portion between the plurality of independent and non-electrically connected, coiled antenna circuits formed thereon, the crease including a break, a perforation, or a groove for guiding a folding of the circuit supporting portion.

* * * * *